United States Patent
Park et al.

(10) Patent No.: US 9,635,683 B2
(45) Date of Patent: Apr. 25, 2017

(54) METHOD AND APPARATUS FOR TRANSMITTING UPLINK CONTROL SIGNALS IN WIRELESS COMMUNICATION SYSTEM

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 46 days.

(21) Appl. No.: 14/650,493

(22) PCT Filed: Jan. 9, 2014

(86) PCT No.: PCT/KR2014/000254
§ 371 (c)(1),
(2) Date: Jun. 8, 2015

(87) PCT Pub. No.: WO2014/109568
PCT Pub. Date: Jul. 17, 2014

(65) Prior Publication Data
US 2015/0334734 A1 Nov. 19, 2015

Related U.S. Application Data

(60) Provisional application No. 61/751,281, filed on Jan. 11, 2013.

(51) Int. Cl.
*H04L 1/18* (2006.01)
*H04L 5/00* (2006.01)
(Continued)

(52) U.S. Cl.
CPC ....... *H04W 72/1268* (2013.01); *H04L 1/1812* (2013.01); *H04L 1/1822* (2013.01);
(Continued)

(58) Field of Classification Search
CPC ... H04L 5/0055; H04L 5/0057; H04L 1/1825; H04L 1/1822; H04L 1/1861;
(Continued)

(56) References Cited

U.S. PATENT DOCUMENTS

2011/0182200 A1   7/2011  Wan et al.
2011/0235602 A1   9/2011  Ji et al.
(Continued)

FOREIGN PATENT DOCUMENTS

WO   2012/096484   7/2012

OTHER PUBLICATIONS

PCT International Application No. PCT/KR2014/000254, Written Opinion of the International Searching Authority dated Apr. 24, 2014, 1 page.

*Primary Examiner* — Ayaz Sheikh
*Assistant Examiner* — Debebe Asefa
(74) *Attorney, Agent, or Firm* — Lee Hong Degerman Kang Waimey

(57) ABSTRACT

A method and apparatus for transmitting uplink control signals in a wireless communication system is provided. A user equipment (UE) transmits a first uplink control signal for a first type cell to a first eNodeB (eNB) on a first physical uplink control channel (PUCCH) in the first type cell. The UE transmits a second uplink control signal for a second type cell to a second eNB on a second PUCCH in the second type cell. The UE transmits a third uplink control signal for a third type cell to the second eNB on the second PUCCH in the second type cell. The third type cell is a cell where a
(Continued)

PUCCH is not configured, and the UE supports dual connectivity with the first eNB and the second eNB.

14 Claims, 21 Drawing Sheets

(51) Int. Cl.
*H04W 72/12* (2009.01)
*H04W 72/04* (2009.01)
*H04W 76/02* (2009.01)

(52) U.S. Cl.
CPC ............ *H04L 1/1825* (2013.01); *H04L 5/001* (2013.01); *H04L 5/0053* (2013.01); *H04L 5/0055* (2013.01); *H04L 5/0057* (2013.01); *H04W 72/0413* (2013.01); *H04W 76/025* (2013.01); *H04L 1/1861* (2013.01)

(58) Field of Classification Search
CPC .... H04B 17/309; H04B 7/024; H04B 7/0626; H04W 72/1268; H04W 72/0413; H04W 76/025
See application file for complete search history.

(56) References Cited

U.S. PATENT DOCUMENTS

| | | | |
|---|---|---|---|
| 2011/0274099 A1 | 11/2011 | Kwon et al. | |
| 2013/0252606 A1* | 9/2013 | Nimbalker | H04B 17/309 455/434 |
| 2014/0119207 A1* | 5/2014 | Yamada | H04L 5/0035 370/252 |

* cited by examiner

METHOD AND APPARATUS FOR TRANSMITTING UPLINK CONTROL SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2014/000254, filed on Jan. 9, 2014, which claims the benefit of U.S. Provisional Application No. 61/751,281, filed on Jan. 11, 2013, the contents of which are all hereby incorporated by reference herein in their entirety.

BACKGROUND OF THE INVENTION

Field of the Invention

The present invention relates to wireless communications, and more specifically, to a method and apparatus for transmitting uplink control signals in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

In light of operator's big interest in deploying small cells overlaid in a macro cell, some issues are identified for small cell enhancements. One of the issues is to introduce user equipments (UEs) having dual connectivity to a macro cell and small cells. For example, the UE has one connectivity to a macro cell for control plane aspects and another connectivity to a small cell for user plane aspects.

If such dual connectivity is supported, different cells may play different roles. Therefore, functional spit for cells needs to be defined.

SUMMARY OF THE INVENTION

The present invention provides a method and apparatus for transmitting uplink control signals in a wireless communication system. The present invention provides functional split of cells for small cell enhancement. The present invention provides a method for transmitting a hybrid automatic repeat request (HARQ) feedback in dual connectivity.

In an aspect, a method for transmitting, by a user equipment (UE), uplink control signals in a wireless communication system is provided. The method includes transmitting a first uplink control signal for a first type cell to a first eNodeB (eNB) on a first physical uplink control channel (PUCCH) in the first type cell, transmitting a second uplink control signal for a second type cell to a second eNB on a second PUCCH in the second type cell, transmitting a third uplink control signal for a third type cell to the second eNB on the second PUCCH in the second type cell. The third type cell is a cell where a PUCCH is not configured. The UE supports dual connectivity with the first eNB and the second eNB.

The first type cell may be a cell where the UE is configured with PUCCH resources for channel state information (CSI) reporting only for the first type cell.

The first type cell may be a cell where the UE is configured with PUCCH resources for scheduling request only for control data transfer.

The first type cell may be a cell where the UE is configured with PUCCH resources for hybrid automatic repeat request (HARQ) acknowledgement (ACK)/non-acknowledgement (NACK) only for the first type cell.

The second type cell may be a cell where the UE is configured with PUCCH resources for CSI reporting for the third type cell.

The second type cell may be a cell where the UE is configured with PUCCH resources for scheduling request only for user-data transfer.

The second type cell may be a cell where the UE is configured with PUCCH resources for ACK/NCAK for the third type cell.

The second type cell may be autonomously activated when it is configured.

The first eNB may be a master eNB in the dual connectivity, and the second eNB may be a secondary eNB in the dual connectivity.

In another aspect, a user equipment (UE) in a wireless communication system is provided. The UE includes a radio frequency (RF) unit for transmitting or receiving a radio signal, and a processor couple to the RF unit, and configured to transmit a first uplink control signal for a first type cell to a first eNodeB (eNB) on a first physical uplink control channel (PUCCH) in the first type cell, transmit a second uplink control signal for a second type cell to a second eNB on a second PUCCH in the second type cell, and transmit a third uplink control signal for a third type cell to the second eNB on the second PUCCH in the second type cell. The third type cell is a cell where a PUCCH is not configured. The UE supports dual connectivity with the first eNB and the second eNB.

When a UE has dual connectivity with an MeNB and SeNB, HARQ round-trip time (RTT) is maintained, and therefore, reduction of transmission rate can be prevented.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
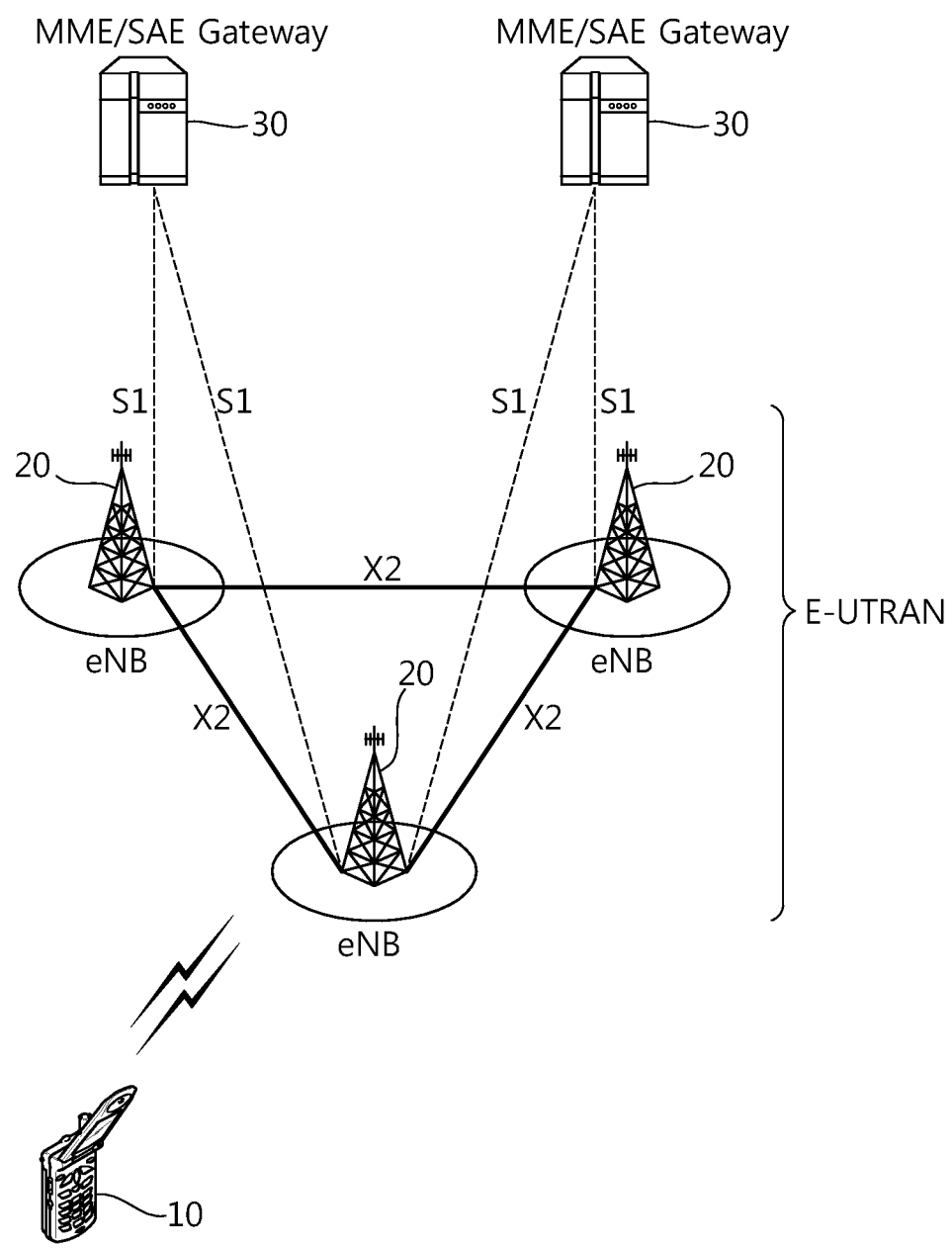
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
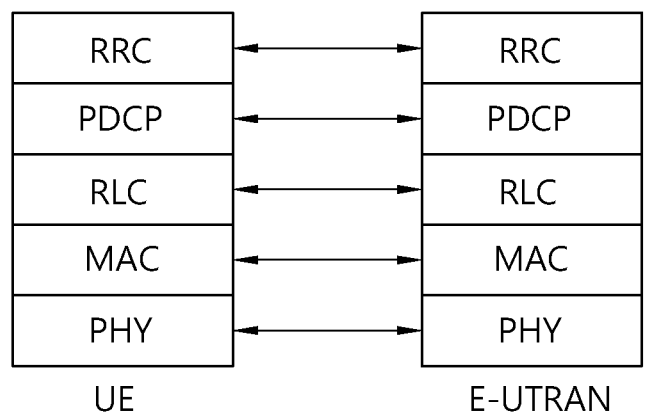
FIG. 2 shows a control plane of a radio interface protocol of an LTE system.
Figure 3:
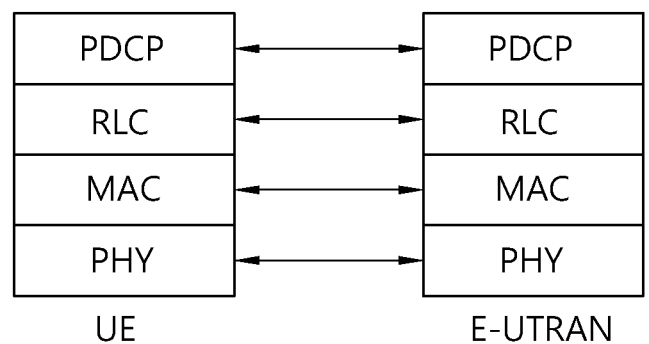
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
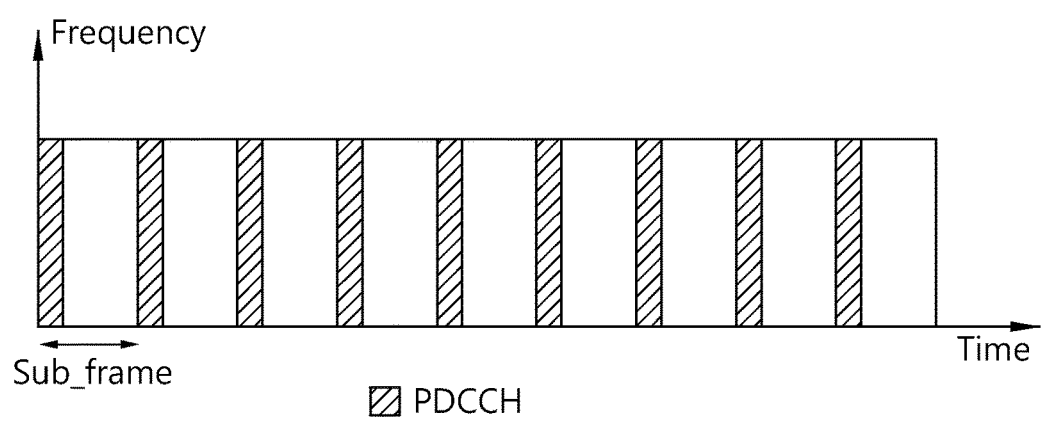
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Carrier aggregation (CA) is described. It may be referred to Section 5.5 of 3GPP TS 36.300 V11.4.0 (2012-12).

In the CA, two or more component carriers (CCs) are aggregated in order to support wider transmission bandwidths up to 100 MHz. A UE may simultaneously receive or transmit on one or multiple CCs depending on its capabilities. A Rel-10 UE with reception and/or transmission capabilities for CA can simultaneously receive and/or transmit on multiple CCs corresponding to multiple serving cells. A Rel-8/9 UE can receive on a single CC and transmit on a single CC corresponding to one serving cell only.

Figure 5:
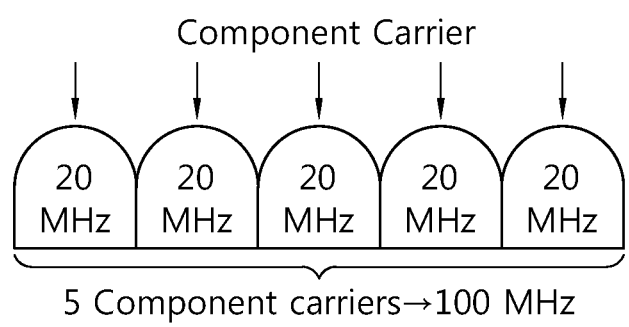
FIG. 5 shows an example of a carrier aggregation of 3GPP LTE-A.

FIG. 5 shows an example of a carrier aggregation of 3GPP LTE-A. Referring to FIG. 5, each CC has a bandwidth of 20 MHz, which is a bandwidth of 3GPP LTE. Up to 5 CCs may be aggregated, so maximum bandwidth of 100 MHz may be configured.

A cell is combination of downlink resources and optionally uplink resources. The linking between the carrier frequency of the downlink resources and the carrier frequency of the uplink resources is indicated in the system information transmitted on the downlink resources. A serving cell may consist of one DL CC and one UL CC. Or, a serving cell may consist of one DL CC only. In the CA, there may be a plurality of serving cells, and the plurality of serving cells consists may consist of one primary cell (PCell) and at least one secondary cell (SCell). A PUCCH transmission and random access procedure may be performed only in the PCell.

Figure 6:
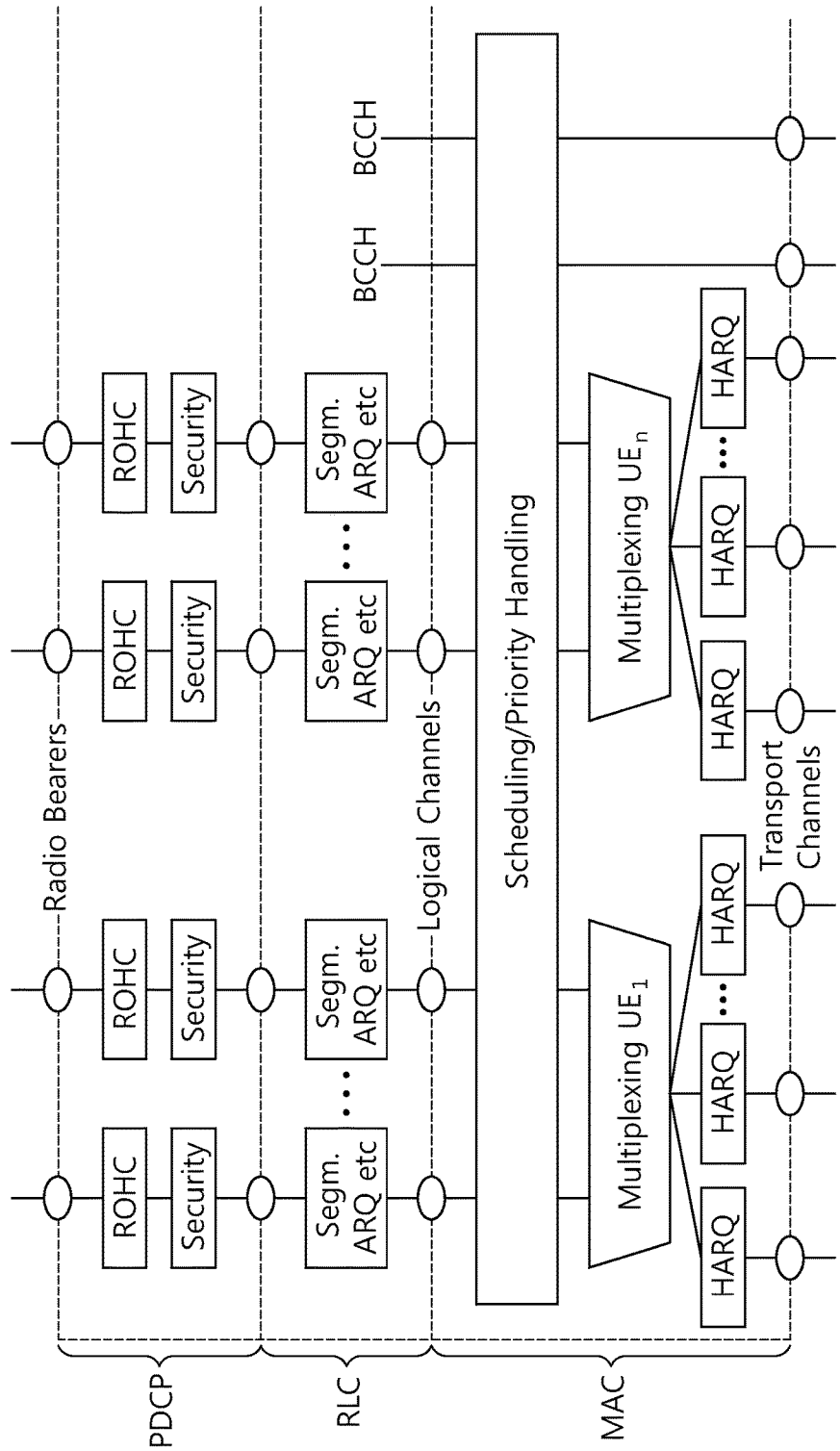
FIG. 6 shows an example of a structure of DL layer 2 when carrier aggregation is used.
Figure 7:
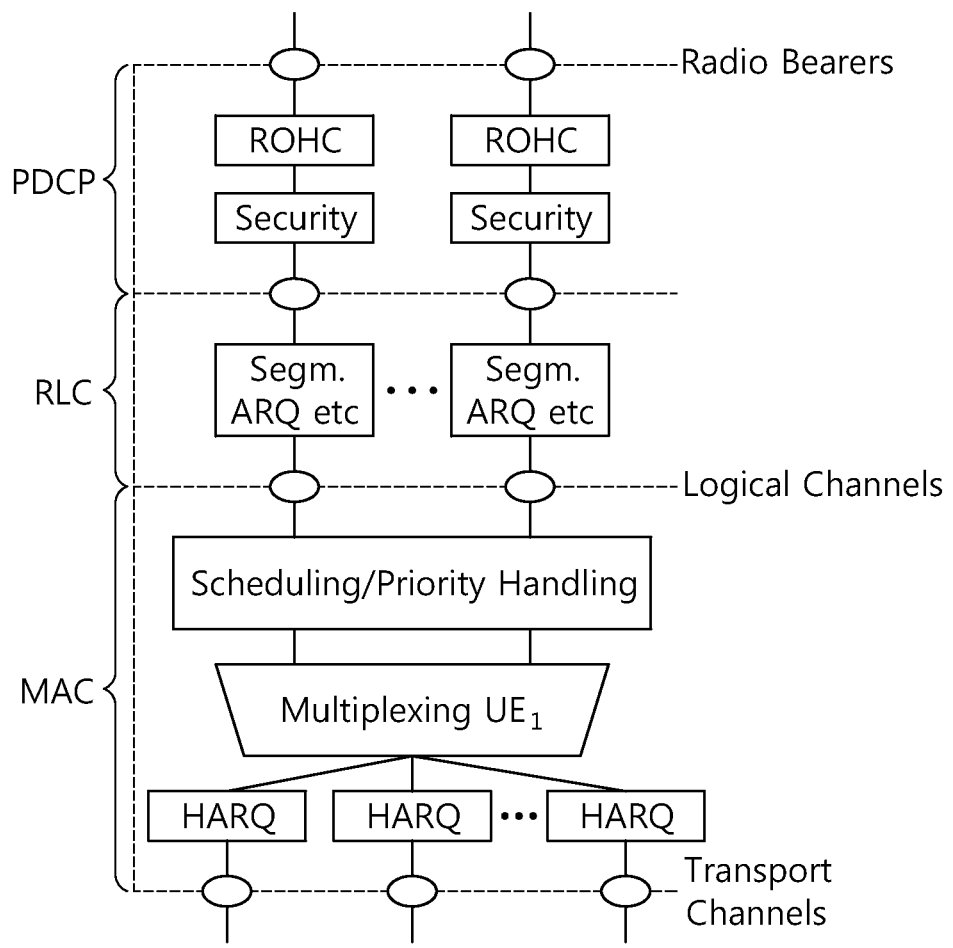
FIG. 7 shows an example of a structure of UL layer 2 when carrier aggregation is used.

FIG. 6 shows an example of a structure of DL layer 2 when carrier aggregation is used. FIG. 7 shows an example of a structure of UL layer 2 when carrier aggregation is used. The carrier aggregation may affect a MAC layer of the L2. For example, since the carrier aggregation uses a plurality of CCs, and each hybrid automatic repeat request (HARQ) entity manages each CC, the MAC layer of 3GPP LTE-A using the CA shall perform operations related to a plurality of HARQ entities. Further, each HARQ entity processes a transport block independently. Therefore, when the CA is used, a plurality of transport blocks may be transmitted or received at the same time through a plurality of CCs.

Small cell enhancement is described. It may be referred to 3GPP TR 36.932 V12.0.0 (2012-12).

Figure 8:
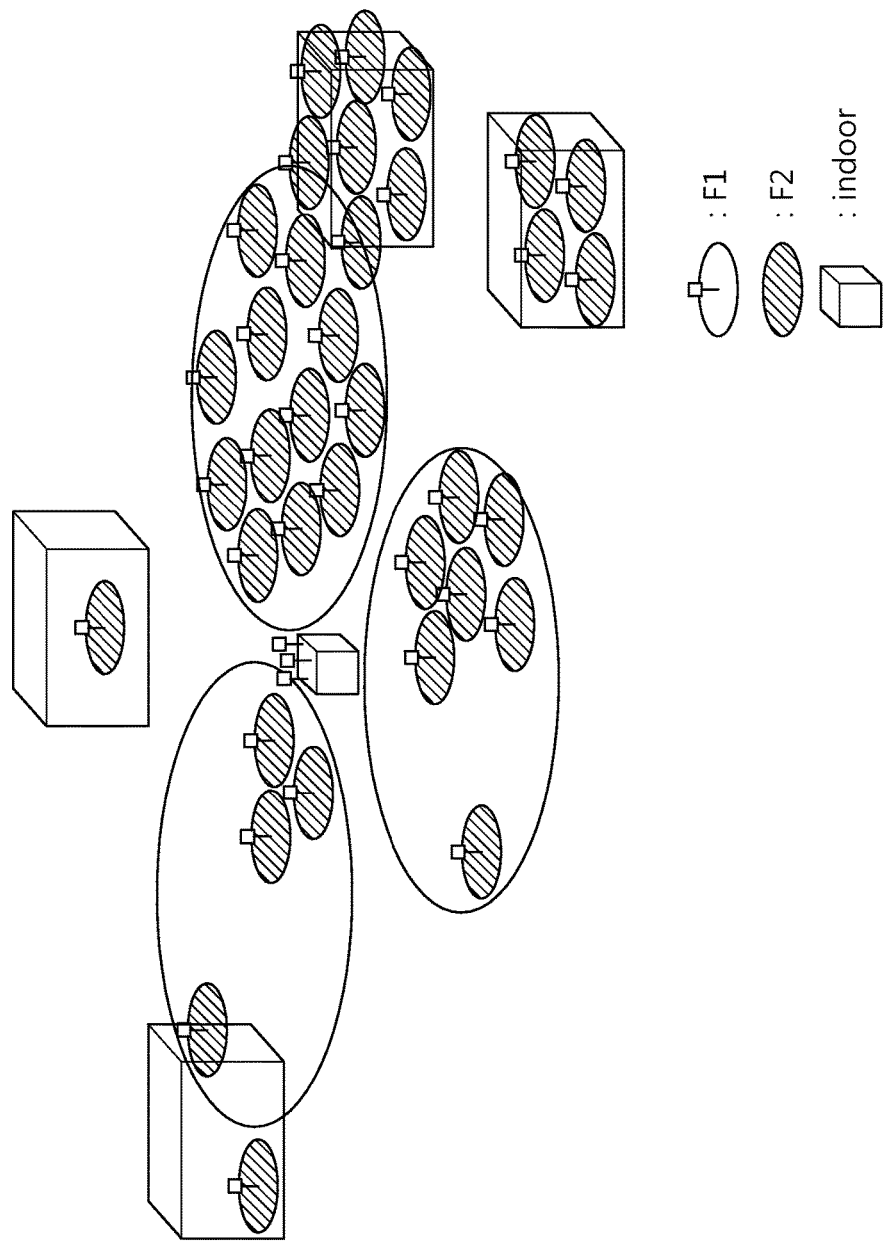
FIG. 8 shows deployment scenarios of small cells with/without macro coverage.

FIG. 8 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 8, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell enhancement should address the deployment scenario in which different frequency bands are separately assigned to macro layer and small cell layer, respectively, where F1 and F2 in FIG. 8 correspond to different carriers in different frequency bands.

Small cell enhancement should be applicable to all existing and as well as future cellular bands, with special focus on higher frequency bands, e.g., the 3.5 GHz band, to enjoy the more available spectrum and wider bandwidth.

Small cell enhancement should also take into account the possibility for frequency bands that, at least locally, are only used for small cell deployments.

Co-channel deployment scenarios between macro layer and small cell layer should be considered as well.

Some example spectrum configurations are:
  Carrier aggregation on the macro layer with bands X and Y, and only band X on the small cell layer
  Small cells supporting carrier aggregation bands that are co-channel with the macro layer
  Small cells supporting carrier aggregation bands that are not co-channel with the macro layer One potential co-channel deployment scenario is dense outdoor co-channel small cells deployment, considering low mobility UEs and non ideal backhaul. All small cells are under the Macro coverage.

Small cell enhancement should be supported irrespective of duplex schemes (FDD/TDD) for the frequency bands for macro layer and small cell layer. Air interface and solutions for small cell enhancement should be band-independent, and aggregated bandwidth per small cell should be no more than 100 MHz.

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain should be considered. Non-full buffer and full buffer traffic are both included, and non-full buffer traffic is prioritized to verify the practical cases.

Backward compatibility, i.e., the possibility for legacy (pre-Release 12) UEs to access a small-cell node/carrier, is desirable for small cell deployments.

The introduction of non-backwards compatible features should be justified by sufficient gains.

For small cell enhancement, dual connectivity may be supported. By dual connectivity, a UE may be connected to both a macro cell and small cell.

Figure 9:
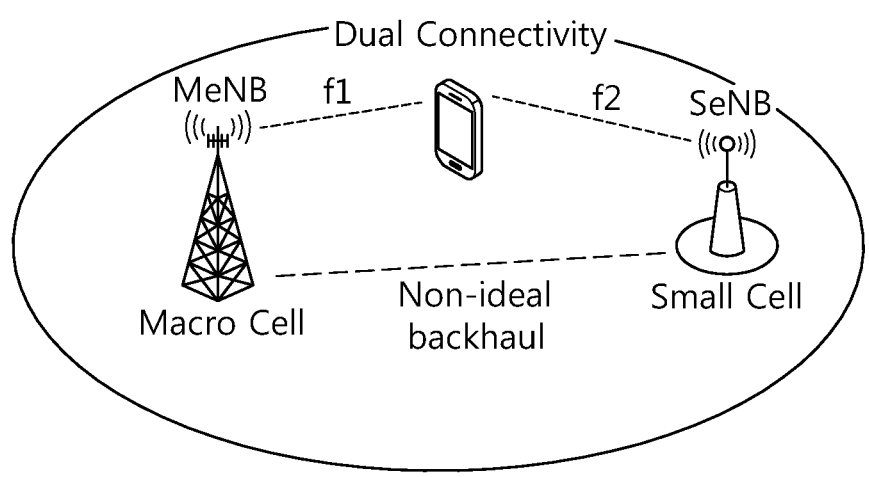
FIG. 9 shows an example of dual connectivity to a macro cell and small cell.

FIG. 9 shows an example of dual connectivity to a macro cell and small cell.

Referring to FIG. 9, an MeNB stands for a master eNB (or, a macro cell eNB), and an SeNB stands for a secondary eNB (or, a small cell eNB). The UE has a connection with the MeNB in frequency f1. In dual connectivity, the MeNB controls the macro cell, and is the eNB which terminates at least S1-MME and therefore act as mobility anchor towards the CN. Also, the UE has a connection with the SeNB in frequency f2. In dual connectivity, the SeNB controls one or more small cells, and is the eNB providing additional radio resources for the UE, which is not the MeNB. Accordingly, the UE may receive control signaling from the MeNB, and may receive data from the SeNB. The interface between the MeNB and SeNB is called an Xn interface. The Xn interface is assumed to be non-ideal backhaul. For example, delay in the Xn interface could be up to 60 ms.

Figure 10:
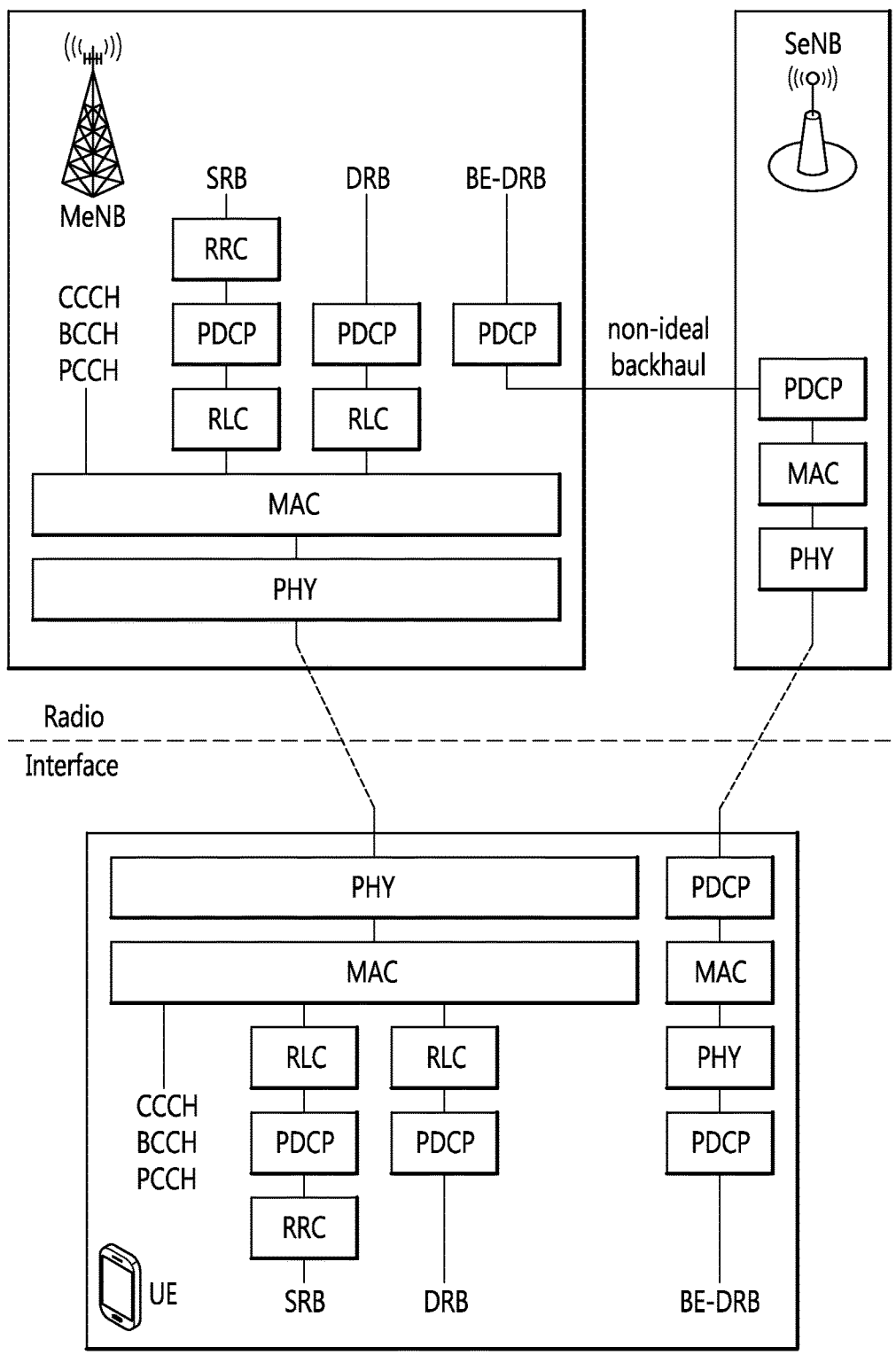
FIG. 10 shows an example of protocol architecture supporting dual connectivity.

FIG. 10 shows an example of protocol architecture supporting dual connectivity.

Referring to FIG. 10, the SeNB is responsible for transmitting best effort (BE) type traffic, while the MeNB is responsible for transmitting other types of traffic such as voice over VoIP, streaming data, or signaling data. That is, the SeNB is responsible for transmitting BE-DRBs, and the MeNB is responsible for transmitting other RB, such as SRBs and other DRBs. In the architecture described in FIG. 10, PDCP and RLC entities are located in different network nodes. That is, the PDCP entity is located in the MeNB and the RLC entity is located in the SeNB. In the UE side, the protocol architecture is same as prior art except that the MAC entity is setup for each eNB (i.e., MeNB and SeNB). Meanwhile, the protocol architecture described in FIG. 10 is just an example, and various protocol architectures may be used.

According to the prior art for the CA, HARQ feedbacks of all of the plurality of cells are transmitted through the PCell to the eNB. When the UE have dual connectivity with the MeNB and SeNB, HARQ transmission is performed for a cell corresponding to each connectivity. The UE transmits a HARQ feedback for HARQ transmission from the SeNB to the MeNB on the PCell, and the MeNB transfer the received HARQ feedback to the SeNB through the Xn interface. The SeNB may perform HARQ retransmission according to the transferred HARQ feedback. Since the HARQ feedback is transferred from the MeNB to the SeNB through the Xn interface, delay may occur. In addition, HARQ round-trip time (RTT) may increase, and accordingly, transmission rate may be reduced.

To solve the problem described above, functional split of cells to which a UE has connectivity for small cell enhancement may be proposed according to an embodiment of the present invention.

Cells according to an embodiment of the present invention may include as follows:

A cell having functionalities about RRC connection control (called control plane cell)

A cell having functionalities about scheduling for user data transfer (called type 1 user plane cell), and A cell having functionalities about user data transfer only (type 2 user plane cell).

Figure 11:
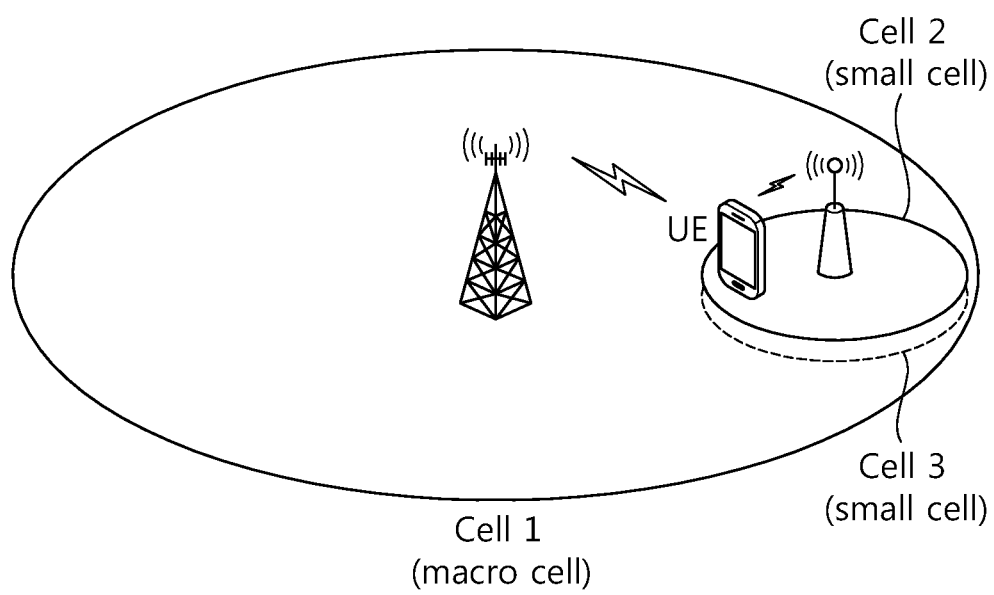
FIG. 11 shows an example of functional split of cells according to an embodiment of the present invention.

FIG. 11 shows an example of functional split of cells according to an embodiment of the present invention.

Referring to FIG. 11, the UE is configured with cell 1, cell 2, and cell 3. Cell 1 is a macro cell, and cell 2 and cell 3 are small cells. Cell 1 is a control plane cell according to an embodiment of the present invention, cell 2 is a type 1 user plane cell according to an embodiment of the present invention, and cell 3 is a type 2 user plane cell according to an embodiment of the present invention. Because the UE is configured with cell for control plane and cell for user plane, it is assumed that the UE has dual connectivity. For dual connectivity, the UE should be configured with at least one control plane cell and one type 1 user plane cell. In addition, the UE may be configured with more user plane cells (either type 1 or type 2).

The control plane cell further refers to:
 a cell where the UE establishes RRC connection,
 a cell where the UE is configured with SRBs: That is, the UE receives/transmits data on only SRBs on this cell.
 a cell where the UE is not configured with DRBs,
 a cell whose physical cell ID (PCI) is used as an input for security key derivation,
 a cell where RRC connection reconfiguration procedure is performed,
 a cell where the UE receives broadcast system information via BCCH,
 a cell where the UE receives a paging message,
 a cell for which the UE performs radio link monitoring (RLM),
 a cell where the UE is configured with PUCCH resources for channel state information (CSI) reporting only for this cell,
 a cell where the UE is configured with PUCCH resources for scheduling request only for control data transfer (i.e., RRC messages),
 a cell where the UE is configured with PUCCH resources for HARQ ACK/NACK only for this cell,
 a cell where the UE performs mobility functions.

The UE may determine a specific cell as the control plane cell, if an indicator notifying that the specific cell is the control plane cell, or if there is no DRB configuration for the specific cell.

The type 1 user plane cell further refers to:
a cell where the UE is not configured with SRBs or is configured with limited SRBs (e.g., SRB1),
a cell where the UE is configured with DRBs only: That is, the UE receives/transmits data on only DRBs on this cell if it is not configured with SRBs.
a cell where the UE receives the PDCCH for type 2 user plane cells.
a cell where the UE is configured with PUCCH resources for CSI reporting for type 2 user plane cells: Also, PUCCH resources include resources for CSI reporting for this cell.
a cell where UE is configured with PUCCH resources for scheduling request only for user-data transfer (e.g., for data over DRBs),
a cell where the UE is configured with PUCCH resources for ACK/NAK for type 2 user plane cells,
a cell for which the UE does not perform RLM.

The type 1 user plane cell may be never deactivated once activated. Further, the type 1 user plane cell may be autonomously activated when it is configured.

The type 2 user plane cell further refers to:
a cell where the UE is configured with DRBs only,
a cell where the UE is not configured with PUCCH resources for CSI reporting, scheduling request and HARQ ACK/NACK,
a cell for which the UE does not perform RLM.

Figure 12:
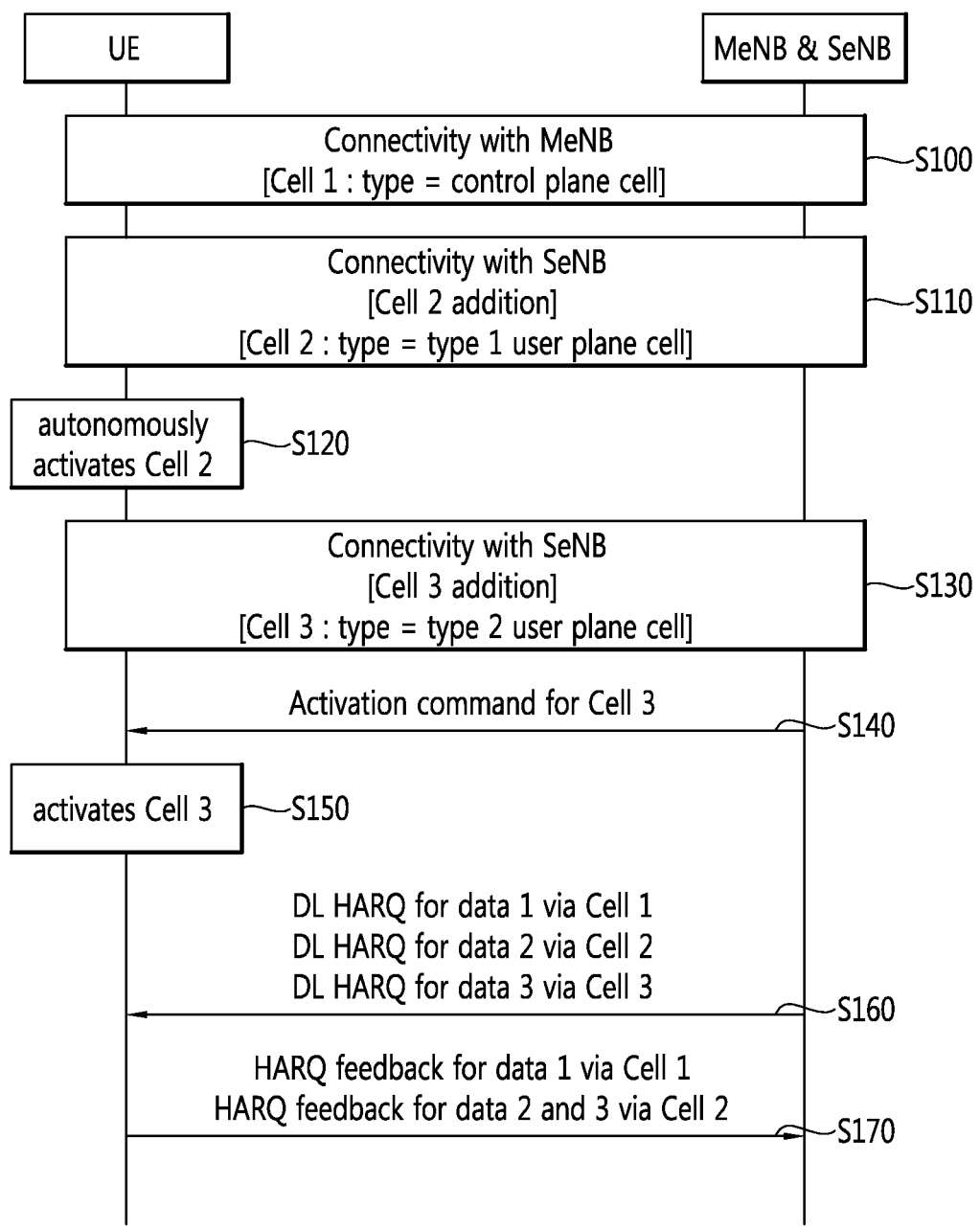
FIG. 12 shows an example of HARQ and activation operation according to an embodiment of the present invention.

FIG. 12 shows an example of HARQ and activation operation according to an embodiment of the present invention.

In step S100, the UE has connectivity with the MeNB. The UE is configured with the cell 1. The cell 1 belongs to the MeNB and its type is the control plane cell.

In step S110, the UE has connectivity with the SeNB by adding the cell 2 belonging to the SeNB. The type of the cell 2 is the type 1 user plane cell.

In step S120, because the cell 2 is the type 1 user plane cell, the UE autonomously activate the cell 2.

In step S130, the UE is configured with the cell 3. The cell 3 also belongs to the SeNB and its type is the type 2 user plane cell.

In step S140, the UE receives an activation command for the cell 3.

In step S150, upon receiving the activation command, the UE activates the cell 3.

In step S160, under HARQ operation, the UE receives data 1, 2, and 3 via the cell 1, 2, and 3 respectively.

In step S170, for data 1, the UE transmits HARQ feedback via the cell 1. For the data 2 and 3, the UE transmits HARQ feedbacks via the cell 2. That is, the UE does not transmit the HARQ feedback for data 3 via the cell 3.

Figure 13:
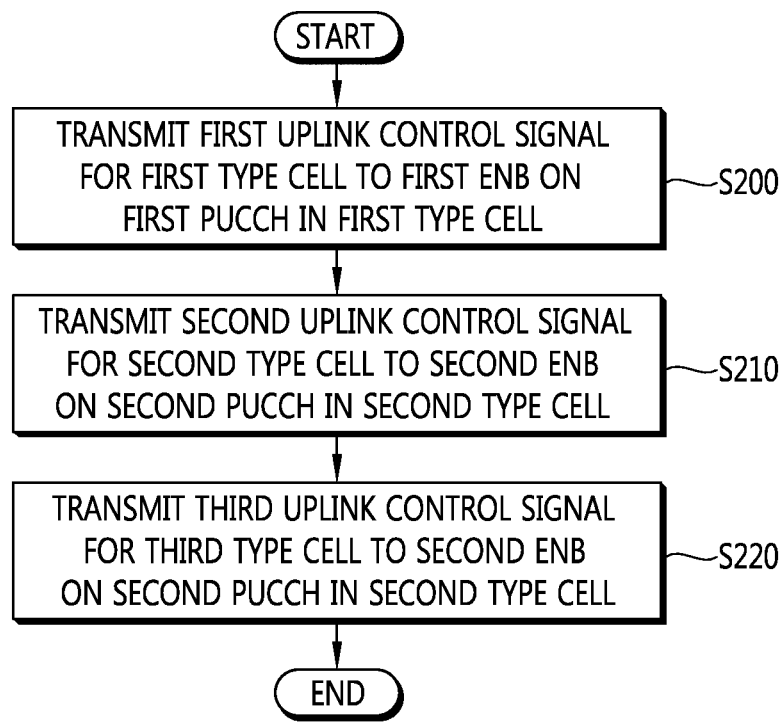
FIG. 13 shows an example of a method for transmitting uplink control signals according to an embodiment of the present invention.

FIG. 13 shows an example of a method for transmitting uplink control signals according to an embodiment of the present invention.

In step S200, the UE transmits a first uplink control signal for a first type cell to a first eNB on a first PUCCH in the first type cell. In step S210, the UE transmits a second uplink control signal for a second type cell to a second eNB on a second PUCCH in the second type cell. In step S220, the UE transmits a third uplink control signal for a third type cell to the second eNB on the second PUCCH in the second type cell. The third type cell is a cell where a PUCCH is not configured. Further, the UE supports dual connectivity with the first eNB and the second eNB.

If cells, whose functionalities are split according to an embodiment of the present invention, are aggregated for the CA, two alternatives for CA operation under small cell scenarios may be proposed.

1) The macro cell (Cell 1 in FIG. 11) may be configured as new PCell. New PCell refers to the control plane cell. In order to discriminate the new PCell from the conventional PCell, when network configures the new PCell to the UE, the network may indicate whether the configured cell is the new PCell or not. The network may indicate that implicitly (e.g., absence of DRB configuration) or explicitly (e.g., new PCell indicator).

Figure 14:
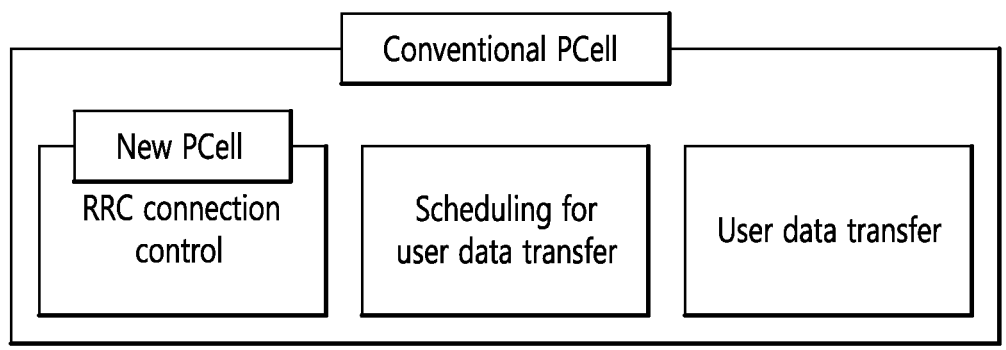
FIG. 14 shows comparisons of roles between conventional PCell and new PCell according to an embodiment of the present invention.

FIG. 14 shows comparisons of roles between conventional PCell and new PCell according to an embodiment of the present invention. Referring to FIG. 14, the new PCell plays limited roles compared to the conventional PCell. That is, the new PCell may only play roles about RRC connection control, not about scheduling for user data transfer, and user data transfer.

One or some of small cells may be configured as reference SCell. In FIG. 11, cell 2 is the reference SCell. Reference SCell refers to the type 1 user plane cell.

Figure 15:
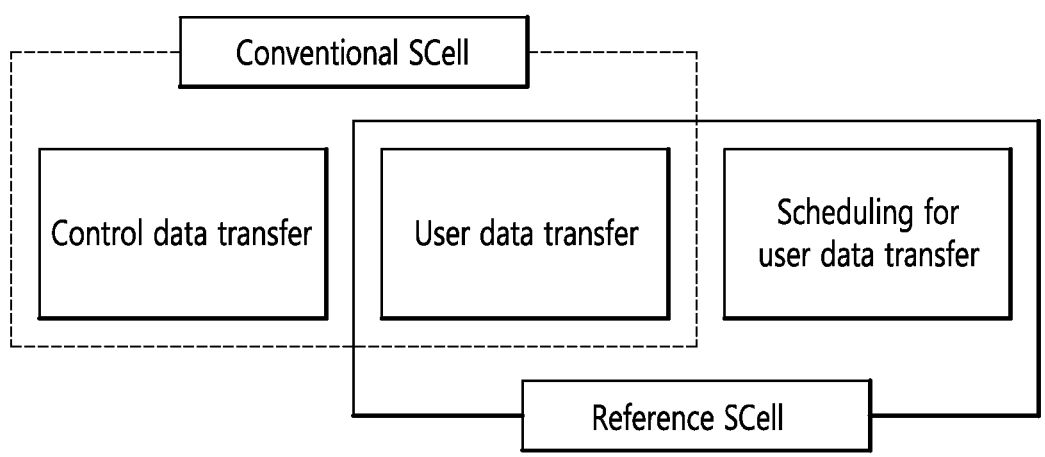
FIG. 15 shows comparisons of roles between conventional SCell and reference SCell according to an embodiment of the present invention.

FIG. 15 shows comparisons of roles between conventional SCell and reference SCell according to an embodiment of the present invention. Referring to FIG. 15, the reference SCell plays roles about scheduling for type 2 user plane cell as well as user data transfer. However, the reference SCell does not play roles about control data transfer, while the conventional SCell plays that. Control data transfer means transferring RRC message like data over SRBs. Different from the conventional SCell, the reference SCell may be never deactivated once activated. Also, the reference SCell may be autonomously activated when it is configured.

Rest of small cells may be configured as new SCell. In FIG. 11, cell 3 is the new SCell. The New SCell refers to the type 2 user plane cell.

Figure 16:
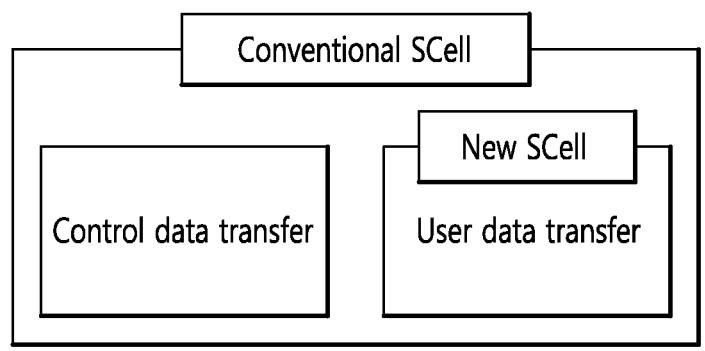
FIG. 16 shows comparisons of roles between conventional SCell and new SCell according to an embodiment of the present invention.

FIG. 16 shows comparisons of roles between conventional SCell and new SCell according to an embodiment of the present invention. Difference between the conventional SCell and new SCell is that the new SCell is not used to transfer control data over SRBs. The new Scell only plays roles about user data transfer.

2) The macro cell may be configured as an anchor cell. The anchor cell refers to the control plane cell.

Figure 17:
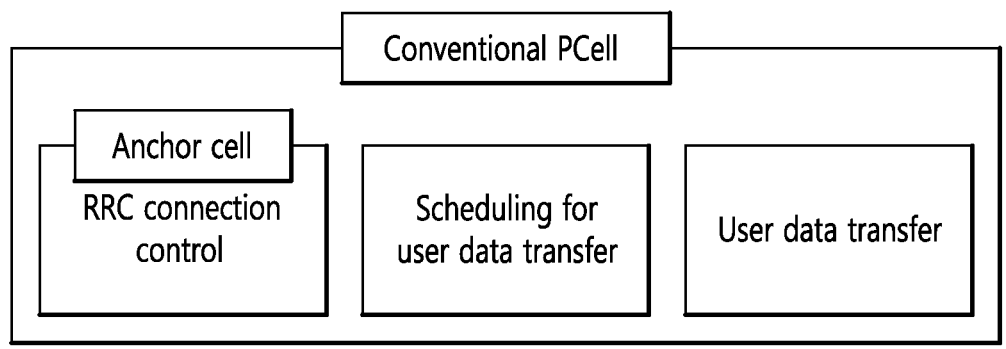
FIG. 17 shows comparisons of roles between conventional PCell and anchor cell according to an embodiment of the present invention.

FIG. 17 shows comparisons of roles between conventional PCell and anchor cell according to an embodiment of the present invention. Referring to FIG. 17, the anchor cell plays limited roles compared to the conventional PCell. The anchor cell may only play roles about RRC connection control.

One or some of small cells may be configured as new PCell. The new PCell refers to the type 1 user plane cell.

Figure 18:
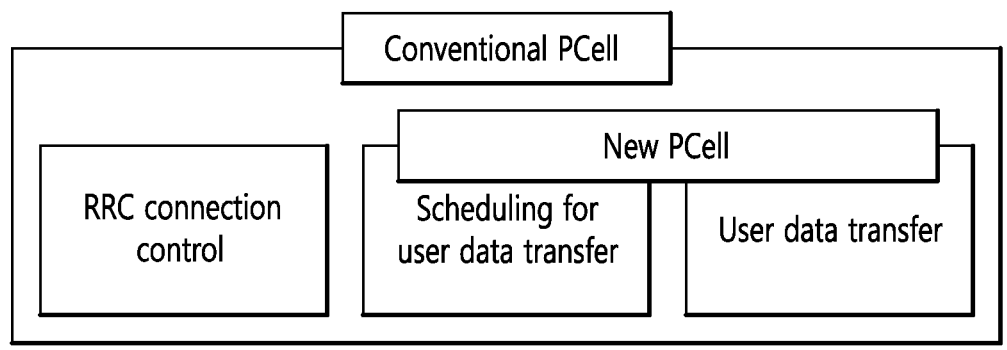
FIG. 18 shows comparisons of roles between conventional PCell and new PCell according to an embodiment of the present invention.

FIG. 18 shows comparisons of roles between conventional PCell and new PCell according to an embodiment of the present invention. Referring to FIG. 18, the new PCell also plays limited roles compared to the conventional PCell. The new PCell may only plays roles about scheduling for user data transfer and user data transfer.

Rest of small cells can be configured as new SCell. New SCell refers to type 2 user plane cell.

Figure 19:
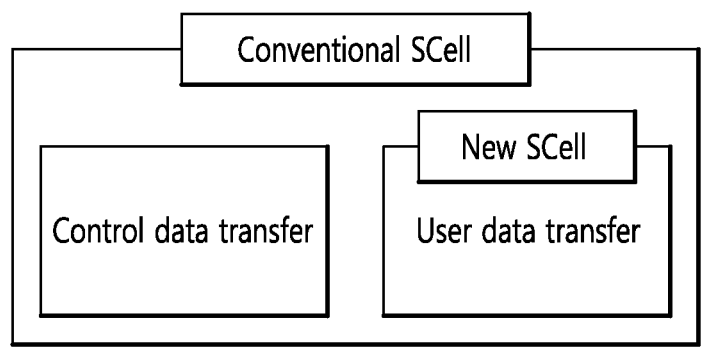
FIG. 19 shows comparisons of roles between conventional SCell and new SCell according to an embodiment of the present invention.

FIG. 19 shows comparisons of roles between conventional SCell and new SCell according to an embodiment of the present invention. Referring to FIG. 19, the new SCell only plays roles about user data transfer.

Because the anchor cell is used, it is possible to operate CA that the anchor cell is not part of aggregated cells.

Figure 20:
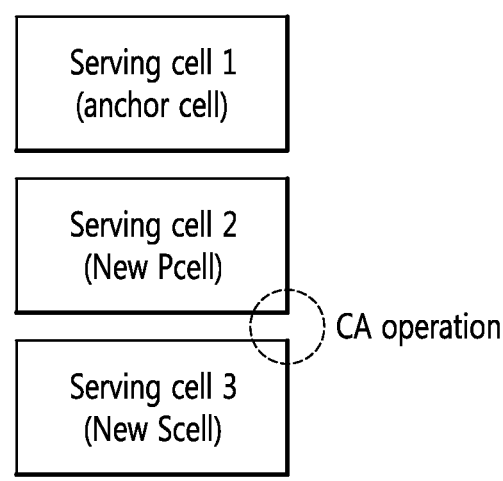
FIG. 20 shows an example of CA operation that an anchor cell is not part of aggregated cells according to an embodiment of the present invention.

FIG. 20 shows an example of CA operation that an anchor cell is not part of aggregated cells according to an embodiment of the present invention.

Referring to FIG. 20, serving cell 1 is the anchor cell, serving cell 2 is the new PCell, and serving cell 3 is the new SCell. Although the UE is configured with three cells, serving cell 2 and serving cell 3 only are considered as serving cells for CA. That is, serving cell 1 (anchor cell) may be considered as a serving cell for normal operations but not serving cell for CA operations. For example, activation/deactivation mechanism may not be applied to the serving cell 1. Further, measurement event and configuration for CA may not be applied to the serving cell 1. For example, the UE may perform measurement events associated with the serving cell 1 regardless of CA. Further, the serving cell 1 may be kept if new PCell is changed/removed.

Figure 21:
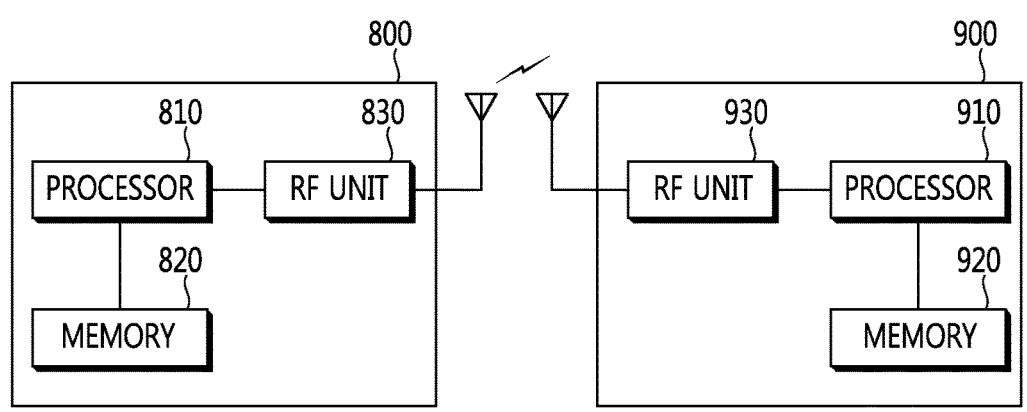
FIG. 21 is a block diagram showing wireless communication system to implement an embodiment of the present invention.

FIG. 21 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), uplink control signals in a wireless communication system, the method comprising:
   transmitting a first uplink control signal for a first type cell to a master eNodeB (eNB) on a first physical uplink control channel (PUCCH) in the first type cell,
   wherein the first type cell is a cell where a RRC connection control is performed;
   transmitting a second uplink control signal for a second type cell to a second eNB on a second PUCCH in the second type cell,
   wherein the second type cell is a cell where a scheduling for user data transfer is performed; and
   transmitting a third uplink control signal for a third type cell to the secondary eNB on the second PUCCH in the second type cell,
   wherein the third type cell is a cell where a PUCCH is not configured and a user data transfer is performed,
   wherein the first type cell belongs to the master eNB,
   wherein the second type cell and the third type cell belong to the secondary eNB, and
   wherein the UE supports dual connectivity with the first eNB and the second eNB.

2. The method of claim 1, wherein the first type cell is a cell where the UE is configured with PUCCH resources for channel state information (CSI) reporting only for the first type cell.

3. The method of claim 1, wherein the first type cell is a cell where the UE is configured with PUCCH resources for scheduling request only for control data transfer.

4. The method of claim 1, wherein the first type cell is a cell where the UE is configured with PUCCH resources for hybrid automatic repeat request (HARQ) acknowledgement (ACK)/non-acknowledgement (NACK) only for the first type cell.

5. The method of claim 1, wherein the second type cell is a cell where the UE is configured with PUCCH resources for CSI reporting for the third type cell.

6. The method of claim 1, wherein the second type cell is a cell where the UE is configured with PUCCH resources for scheduling request only for user-data transfer.

7. The method of claim 1, wherein the second type cell is a cell where the UE is configured with PUCCH resources for ACK/NCAK for the third type cell.

8. The method of claim 1, wherein the second type cell is autonomously activated when it is configured.

9. A user equipment (UE) in a wireless communication system, the UE comprising:
   a radio frequency (RF) unit for transmitting or receiving a radio signal; and
   a processor couple to the RF unit, and configured to:
      transmit a first uplink control signal for a first type cell to a master eNodeB (eNB) on a first physical uplink control channel (PUCCH) in the first type cell,
      wherein the first type cell is a cell where a RRC connection control is performed;
      transmit a second uplink control signal for a second type cell to a second eNB on a second PUCCH in the second type cell,
      wherein the second type cell is a cell where a scheduling for user data transfer is performed;

transmit a third uplink control signal for a third type cell to the secondary eNB on the second PUCCH in the second type cell, wherein the third type cell is a cell where a PUCCH is not configured and a user data transfer is performed, wherein the first type cell belongs to the master eNB, wherein the second type cell and the third type cell belong to the secondary eNB, and wherein the UE supports dual connectivity with the first eNB and the second eNB.

10. The UE of claim 9, wherein the first type cell is a cell where the UE is configured with PUCCH resources for channel state information (CSI) reporting only for the first type cell.

11. The UE of claim 9, wherein the first type cell is a cell where the UE is configured with PUCCH resources for scheduling request only for control data transfer.

12. The UE of claim 9, wherein the first type cell is a cell where the UE is configured with PUCCH resources for hybrid automatic repeat request (HARQ) acknowledgement (ACK)/non-acknowledgement (NACK) only for the first type cell.

13. The UE of claim 9, wherein the second type cell is a cell where the UE is configured with PUCCH resources for CSI reporting for the third type cell.

14. The UE of claim 9, wherein the second type cell is a cell where the UE is configured with PUCCH resources for scheduling request only for user-data transfer.

* * * * *